United States Patent
Levay et al.

(10) Patent No.: US 9,728,356 B2
(45) Date of Patent: Aug. 8, 2017

(54) PROJECTED KNOB DEVICE

(71) Applicants: DENSO International America, Inc., Southfield, MI (US); DENSO CORPORATION, Kariya, Aichi-pref. (JP)

(72) Inventors: Christopher Levay, Grand Rapids, MI (US); Christopher Guzman, Saint Clair Shores, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 111 days.

(21) Appl. No.: 14/635,500

(22) Filed: Mar. 2, 2015

(65) Prior Publication Data

US 2016/0079013 A1    Mar. 17, 2016

Related U.S. Application Data

(60) Provisional application No. 62/049,476, filed on Sep. 12, 2014.

(51) Int. Cl.
| | | |
|---|---|---|
| *H01H 9/00* | (2006.01) | |
| *H01H 19/02* | (2006.01) | |
| *B60K 37/06* | (2006.01) | |
| *H01H 9/18* | (2006.01) | |

(52) U.S. Cl.
CPC ........... *H01H 19/025* (2013.01); *B60K 37/06* (2013.01); *H01H 2009/188* (2013.01); *H01H 2219/014* (2013.01); *H01H 2219/028* (2013.01); *H01H 2219/066* (2013.01); *H01H 2231/026* (2013.01)

(58) Field of Classification Search
CPC .......... H01H 19/025; H01H 2219/036; H01H 2219/066
USPC ......................................... 200/316
See application file for complete search history.

(56) References Cited

U.S. PATENT DOCUMENTS

| | | | | |
|---|---|---|---|---|
| 3,636,915 A * | 1/1972 | Ruppert | ................... | G02B 5/04 116/337 |
| 3,754,106 A * | 8/1973 | MacDonald | ........... | H01H 9/165 200/11 DA |
| 4,221,945 A * | 9/1980 | Mobus | ................... | H01H 9/182 116/258 |
| 6,348,772 B1 * | 2/2002 | May | ...................... | B60K 37/06 200/314 |
| 7,202,428 B2 * | 4/2007 | Ogawa | ................... | G05G 1/105 200/308 |
| 7,238,904 B2 * | 7/2007 | Ogawa | ................. | B60H 1/0065 200/336 |
| 7,255,061 B2 * | 8/2007 | Denton | .................. | G05G 1/105 116/286 |

(Continued)

FOREIGN PATENT DOCUMENTS

JP     2009-076306 A    4/2009

*Primary Examiner* — Kyung Lee (57) ABSTRACT

A knob device includes a knob body, a graphic plate, and a light source. The knob body has a hollow space and has an end equipped with a screen. The graphic plate has multiple graphic windows including graphic symbols, respectively. The light source is configured to emit light through both at least one of the graphic windows and the hollow space to project at least one of the graphic symbols on the screen. The graphic plate is movable to switch the at least one of the graphic symbols to another of the graphic symbols.

15 Claims, 9 Drawing Sheets

(56) References Cited

U.S. PATENT DOCUMENTS

| | | | |
|---|---|---|---|
| 7,745,749 B2 * | 6/2010 | Ito | B60R 11/0264 |
| | | | 200/316 |
| 7,812,274 B2 * | 10/2010 | Dupont | B60K 26/02 |
| | | | 200/316 |
| 8,178,805 B2 * | 5/2012 | Larson | H01H 19/025 |
| | | | 200/316 |
| 8,350,731 B2 * | 1/2013 | Kato | H01H 25/008 |
| | | | 250/231.14 |
| 2005/0098642 A1 * | 5/2005 | Ogawa | B60H 1/00985 |
| | | | 237/12 |

* cited by examiner

PROJECTED KNOB DEVICE

CROSS-REFERENCE TO RELATED APPLICATION

The application claims the benefit of U.S. Provisional Application No. 62/049,476, filed on Sep. 12, 2014. The entire disclosures of the above application are incorporated herein by reference.

TECHNICAL FIELD

The present disclosure relates to a projected knob device.

BACKGROUND

Conventionally, a knob device is equipped to an operation device such as a vehicular head unit and/or a vehicular operation console for manipulating various components such as an audio system and a heating and ventilating air conditioner (HVAC). A knob may be desired to have an indicative function to indicate information of the component.

SUMMARY

The present disclosure addresses the above-described subjects.

According to an aspect of the preset disclosure, a knob device comprises a knob body having a hollow space and having an end equipped with a screen. The knob device further comprises a graphic plate having a plurality of graphic windows including graphic symbols, respectively. The knob device further comprises a light source configured to emit light through both at least one of the graphic windows and the hollow space to project at least one of the graphic symbols on the screen. The graphic plate is movable to switch the at least one of the graphic symbols to an other of the graphic symbols.

According to another aspect of the preset disclosure, a knob device comprises a knob body having a hollow space and having an end equipped with a screen. The knob device further comprises a graphic plate having a plurality of graphic windows including graphic symbols, respectively, the graphic plate being movable to switch between one of the graphic symbols and an other of the graphic symbols. The knob device further comprises a light source configured to emit light through at least one of the graphic windows to project at least one of the graphic symbols as a projected graphic symbol on the screen. The knob device further comprises a rotary sensor configured to detect a rotary position of the knob body. The knob device further comprises a controller configured to receive a rotary signal, which represents the rotary position, from the rotary sensor. The controller is configured, in response to detection of change in the rotary position, to modify projection of at least one of the graphic symbols.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION (First Embodiment)

As follows, a first embodiment of the present disclosure will be described with reference to FIGS. 1 to 8. A shown in FIG. 1, a knob device 10 is a dial knob equipped to a vehicular component and/or an operation console such as an audio system and a heating and ventilating air conditioner (HVAC) for a vehicle. A user may pinch the knob device 10 and may twist the knob device 10 to manipulate the component. Specifically, for example, the user may twist the knob device 10 to increase or decrease a sound volume of an audio device, and/or to increase or decrease a set temperature of an HVAC.

Figure 1:
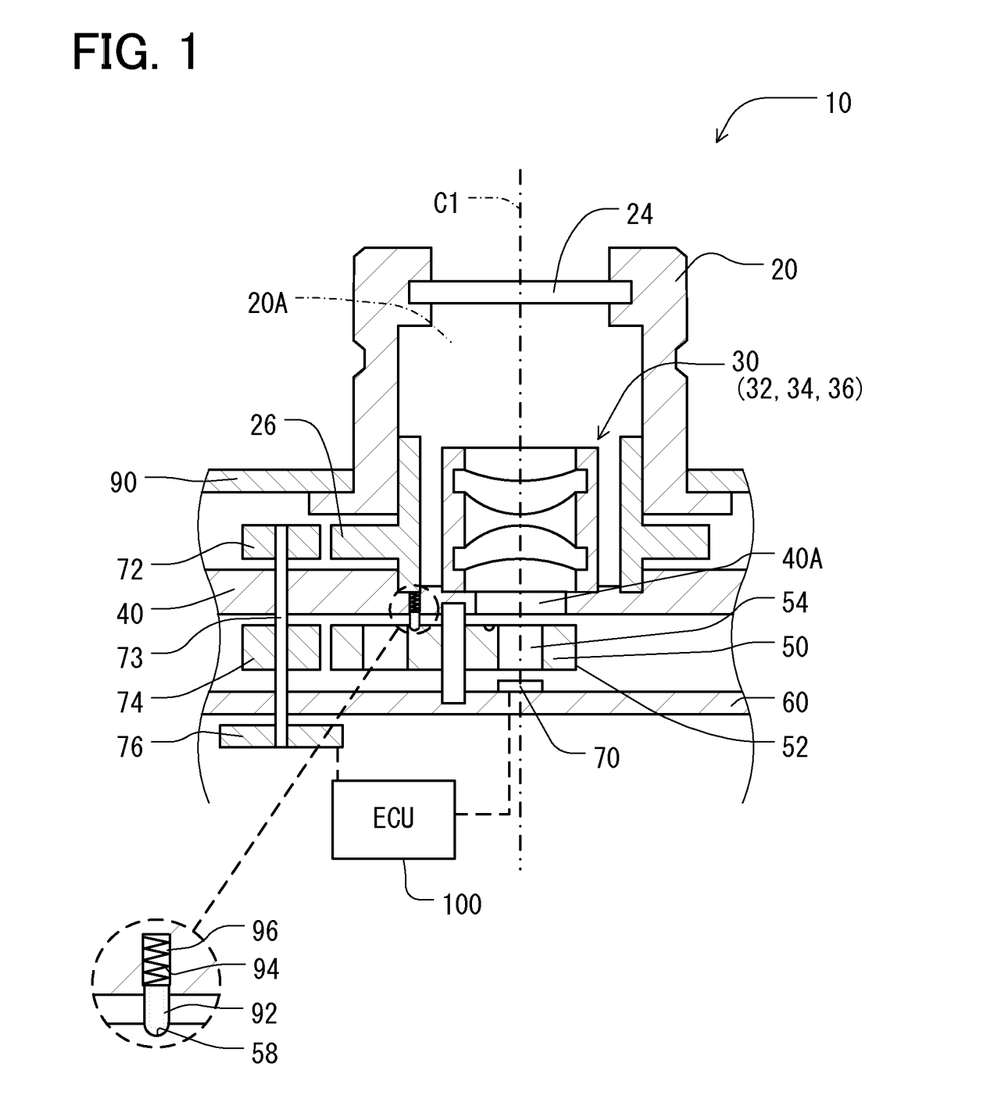
FIG. 1 is a sectional view showing a knob device according to a first embodiment.

The knob device 10 includes a knob body 20, an optical device 30, a base 40, a graphic plate 50, gears, a printed circuit board (PCB) 60, and a light source 70.

The knob body 20 is protruded through a circular opening of a faceplate 90 of the vehicular component. The knob body 20 is a tubular component having a hollow space 20A. The knob body 20 has one opening end and the other opening end both communicating with the hollow space 20A. The one opening end is equipped with a screen 24. The screen 24 is formed of a translucent material or a semitranslucent material such as an acrylic resin. The screen 24 has a transparency and is light conductive. In the present example, the screen 24 is fitted to a slit, which extends along the radially inside of the one opening. The other opening end has a collar, which is in a circular plate shape extending radially outward from the other opening end. The knob body 20 includes a gear member 26, which is in a tubular shape and has an external gear, which extends radially outward. The gear member 26 is affixed into the other end of the knob body 20.

The base 40 is opposed to the faceplate 90 of the vehicular component to form a space therebetween. The base 40 rotatably supports the knob body 20 together with the faceplate 90. Specifically, the base 40 has a circular concavity receiving an end of the gear member 26. The collar of the knob body 20 is abutted on the surface of the faceplate 90, which is opposed to the base 40. In this way, the knob body 20 is supported between the base 40 and the faceplate 90 and is rotatable relative to both the base 40 and the faceplate 90. The base 40 has a through hole 40A at the center of the concavity. The optical device 30 is affixed to a concavity of the base 40. The optical device 30 is coaxial with the through hole 40A and the knob body 20. The optical device 30 includes a tubular body 32 and multiple lenses 34 and 36. The lenses 34 and 36 are accommodated in the tubular body 32.

The PCB 60 is located behind the base 40 to form a space therebetween. The PCB 60 has printed wirings to form various electric circuits.

The graphic plate 50 is located in the space between the base 40 and the PCB 60. According to the first embodiment, the graphic plate 50 is in a disc shape and has a shaft axially supported by both the base 40 and the PCB 60.

Figure 6:
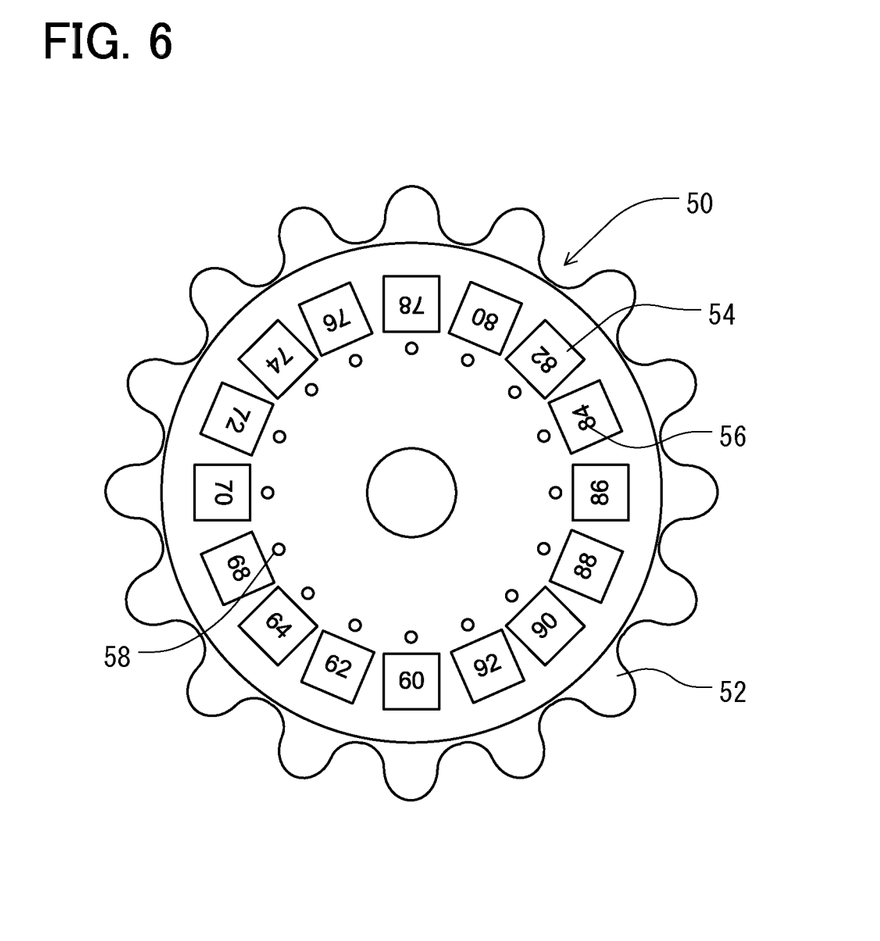
FIG. 6 is a top view showing a graphic plate of the knob device.

As shown in FIG. 6, the graphic plate 50 is in a circular shape and has multiple graphic windows 54. Each of the graphic windows 54 is formed of a translucent material such as an acrylic resin. The graphic windows 54 include graphic symbols 56, respectively. In the present example, each of the graphic windows 54 includes unique one of the graphic symbols 56. The graphic symbol 56 is a stationary and fixed mark. That is, the graphic symbol 56 is immovable in the graphic window 54. The graphic symbol 56 may be printed on the graphic window 54. The graphic symbol 56 may be molded on the graphic window 54. The graphic symbol 56 may be a separated member equipped on the graphic window 54. The graphic symbol 56 may be formed as a groove by engraving the surface of the graphic window 54. The graphic symbol 56 may be formed as a through hole by, for example, etching through the graphic window 54. In this case, the graphic window 54 may be opaque, and the graphic symbol 56 may be configured to pass light therethrough. The graphic plate 50 may be formed of a translucent material entirely, and the graphic plate 50 may be colored entirely while the graphic windows 54 are masked and left as translucent. The graphic symbol 56 may be various marks such as a number, character, and/or a figure. The graphic symbol 56 may be in multiple colors. In the example of FIG. 6, the graphic symbols 56 are numbers from 60 to 92 increasing counterclockwise at an interval.

The graphic plate 50 has multiple dents 58. The dents 58 are arranged circumferentially and are assigned correspondingly to the graphic windows 54. The graphic plate 50 has an outer periphery having a gear portion 52, which forms the external gear extending circumferentially.

Referring back to FIG. 1, the gears include a knob gear 72 and a plate gear 74, which are coaxially connected via a common shaft 73. The common shaft 73 is axially supported by both base 40 and the PCB 60 at both ends. The knob gear 72 and the plate gear 74 are rotatable around the common shaft 73 relative to the base 40 and the PCB 60. The knob gear 72 is meshed with the gear member 26 of the knob body 20. The plate gear 74 is meshed with the gear portion 52 of the graphic plate 50. In this way, the graphic plate 50 is mechanically coupled ultimately with the knob body 20. Thus, the graphic plate 50 is rotatable in conjunction with rotation of the knob body 20 via the gear member 26, the knob gear 72, the plate gear 74, and the gear portion 52. That is, the graphic symbols 56 are rotatable by rotating the knob body 20 by a user.

The light source 70 is affixed to a surface of the PCB 60 and is electrically connected with an electric wiring formed on the PCB 60. The light source 70 is, for example, a light emitting diode (LED) configured to emit light. The light source 70 is arranged along an axis C1 coaxially with the graphic window 54, the through hole 40A of the base 40, the optical device 30, and the screen 24. Therefore, the light source 70 is configured to emit light through the graphic window 54, the through hole 40A, the optical device 30, and the hollow space 20A formed in the knob body 20. Thus, the light source 70 is configured to project the graphic symbol 56, which is aligned on the light source 70, on the screen 24.

A rotary sensor 76 is equipped to an end of the common shaft 73. The rotary sensor 76 is rotatable together with the knob gear 72 and the plate gear 74 via the common shaft 73. The rotary sensor 76 may employ various sensors such as a hall sensor and/or a photo interrupter. The rotary sensor 76 is configured to detect the rotary position of the common shaft 73, which correlates with the rotary positions of the knob body 20 and the graphic plate 50. That is, the rotary sensor 76 is configured to enable detection of the rotary positions of the knob body 20 and the graphic plate 50 according to the detected rotary position.

An electronic control unit (ECU: controller) 100 is electrically connected with the rotary sensor 76 and the light source 70. The controller 100 is configured to receive a signal, which represents the detected rotary position, from the rotary sensor 76. The controller 100 is configured to send a signal or an electric power to the light source 70 to control the light source 70. Specifically, the controller 100 may control a voltage signal applied to the light source 70 to control intensity of light emitted from the light source 70. As described later, the controller 100 is configured, in response to detection of the rotary position of the rotary sensor 76, to modify projection of the graphic symbol 56.

Figure 2:
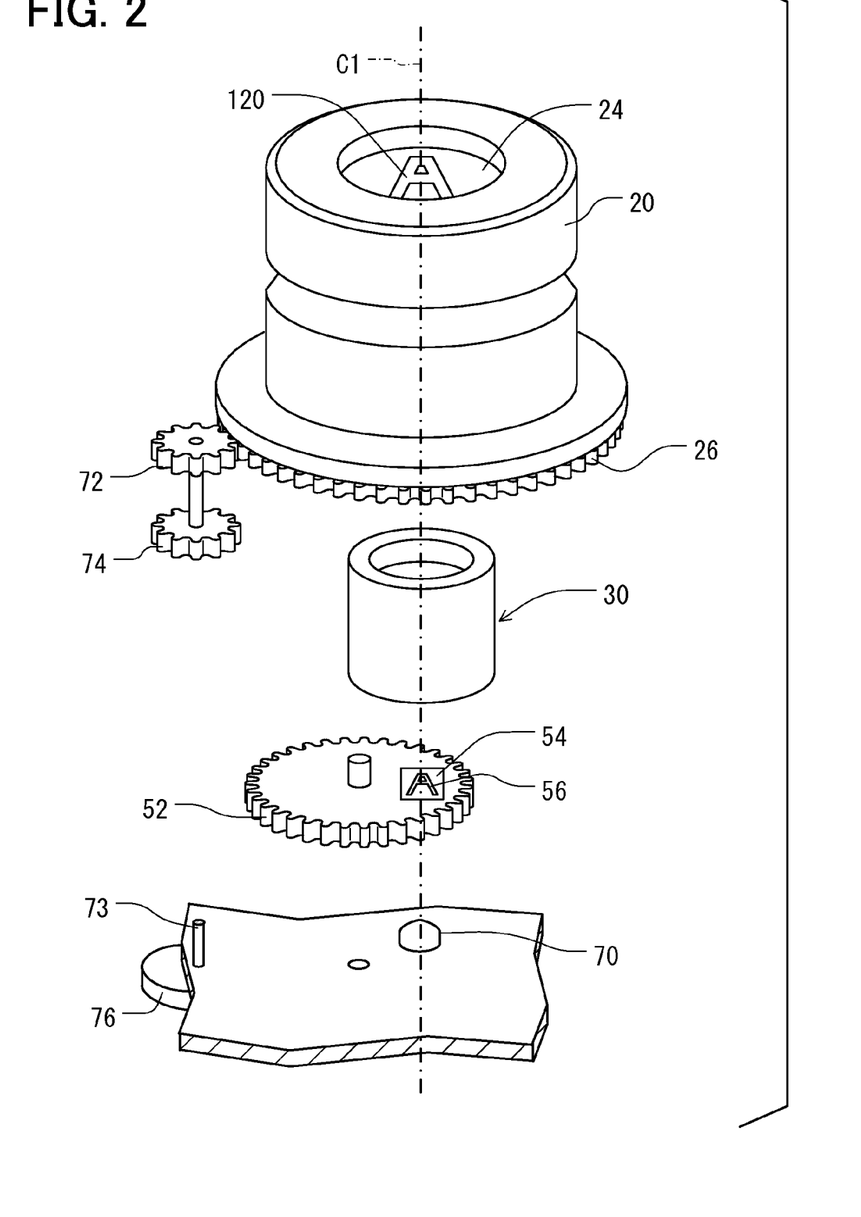
FIG. 2 is a schematic perspective view showing components of the knob device.
Figure 3:
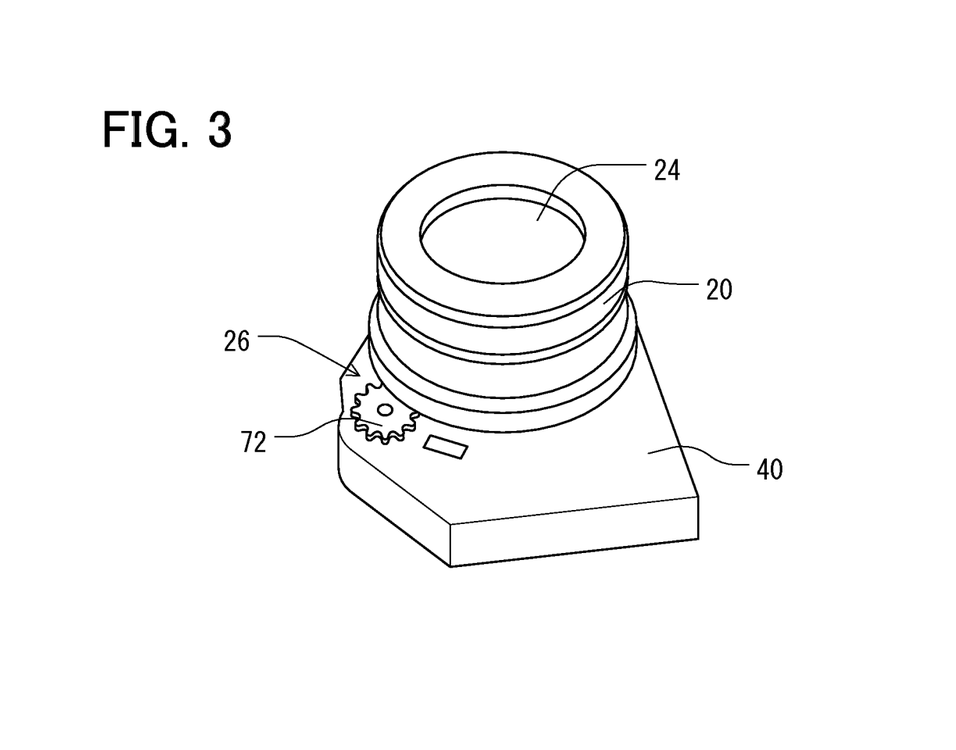
FIG. 3 is a perspective front view showing one example of the knob device.
Figure 4:
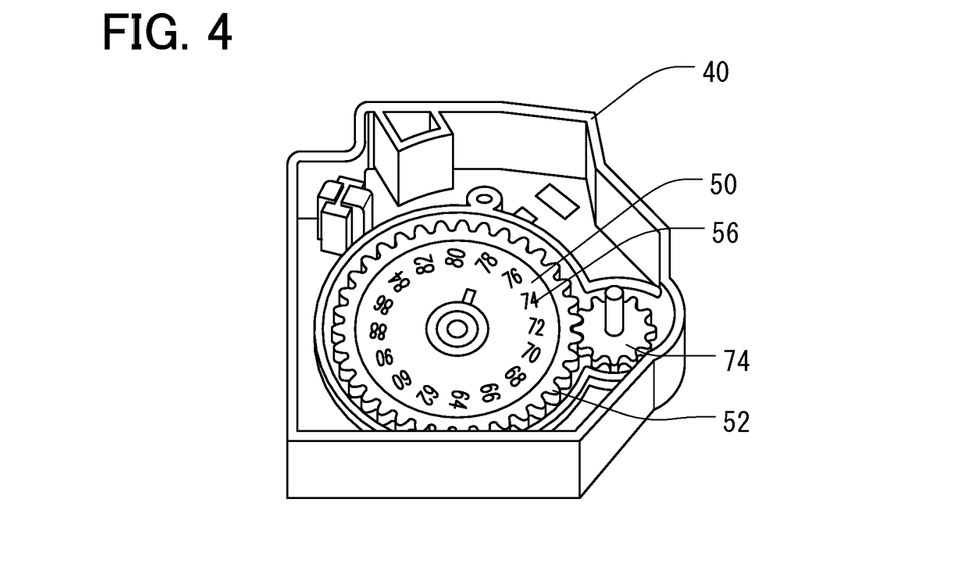
FIG. 4 is a perspective rear view showing the one example of the knob device.

FIG. 2 shows the components of the knob device 10. In FIG. 2, the faceplate 90 and the base 40 are omitted from illustration. In the example of FIG. 2, the graphic symbol 56 includes a letter A, and the letter A is projected on the screen 24 as a projected graphic symbol 120. FIGS. 3 and 4 show one example of the knob device 10 assembled with the components. In FIGS. 3 and 4, the faceplate 90, the PCB 60, the light source 70, and the like are omitted.

Figure 5:
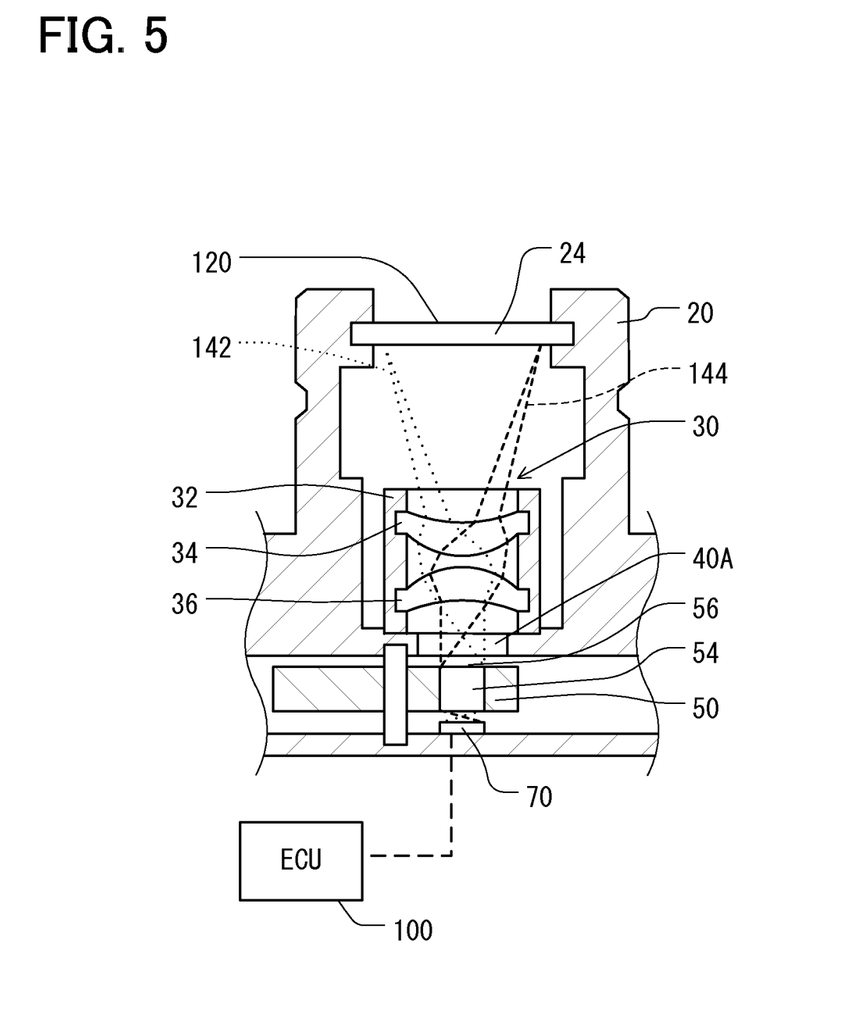
FIG. 5 is a schematic side view showing light paths inside the knob device.

As shown in FIG. 5, the optical device 30 includes lenses 34 and 36 accommodated in the tubular body 32. In the present example, the lenses 34 and 36 include two convex lenses 34 and 36, which are opposed to each other at convex sides. A coarse dotted line 142 shows a light path of one end of the light source 70, and a fine dotted line 144 shows a light path of the other end of the light source 70. The light emitted from the light source 70 is incident into the lens 36. The light is inflected on a surface of the lens 36 when entering the lens 36 and further inflected on a surface of the lens 36 when exiting the lens 36. The light is further incident into the lens 34. The light is inflected on a surface of the lens 34 when entering the lens 34 and further inflected on a surface of the lens 34 when exiting the lens 34.

Thus, the light reaches the backside of the screen 24. In this way, as shown by the coarse dotted line 142 and the fine dotted line 144, the lenses 34 and 36 are configured to magnify the graphic symbol 56 at a magnification ratio to be projected as the projected graphic symbol 120 on the screen 24. According to the present example, the magnification ratio is four times, and the optical device 30 has a 4X optical zoom factor (four-times optical zoom factor).

In FIG. 1, a pin 92 and a spring (biasing member) 94 are provided in a space 96 formed in the base 40. The pin 92 is movable relative to the space 96 and has a tip end projected from the base 40. The spring 94 is accommodated in the space 96 to bias the other end of the pin 92 to urge the tip end of the pin 92 onto the graphic plate 50. The graphic plate 50 has the multiple dents 58 to receive the tip end of the pin 92. Specifically, in the state of FIG. 1, one of the dents 58 receives the tip end of the pin 92. When the graphic plate 50 rotates, the dent 58 also rotates. As the dent 58 rotates, the periphery of the dent 58 raises the tip end of the pin 92 toward the base 40 against the resilience of the spring 94. Subsequently, the tip end of the pin 92 is raised onto a flat surface of the graphic plate 50 to slide on the flat surface. Subsequently, the tip end of the pin 92 is again fitted to an adjacent one dent 58 thereby received by the dent 58. In this way, the pin 92 repeats fitting motion on the dents 58 to produce a click feeling. The click feeling may be produced when, for example, the graphic plate 50 is at a predetermined position at which one of the graphic symbol 56 is aligned relative to the through hole 40A and the optical device 30 to project the projected graphic symbol 120 (FIG. 2) at a center position in the screen 24.

Figure 7A:
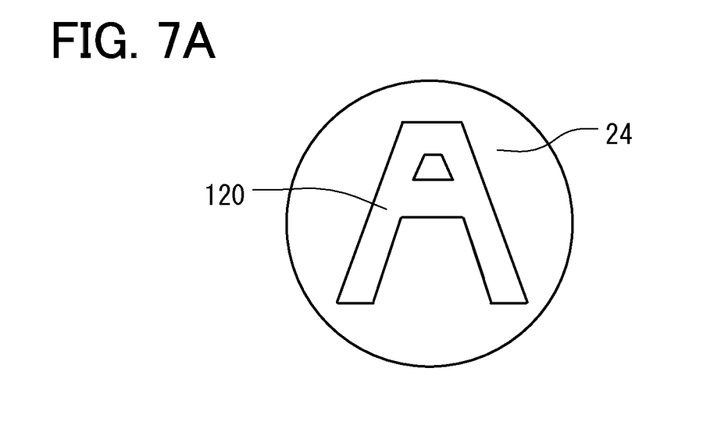
FIGS. 7A to 7C show transition of one projected graphic symbol to another projected graphic symbol.
Figure 7B:
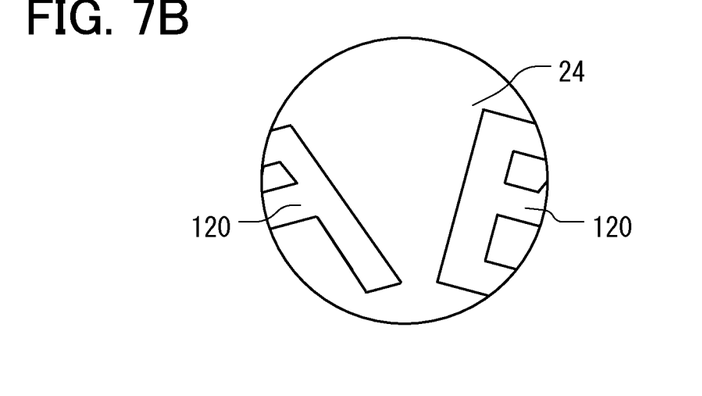
Figure 7C:
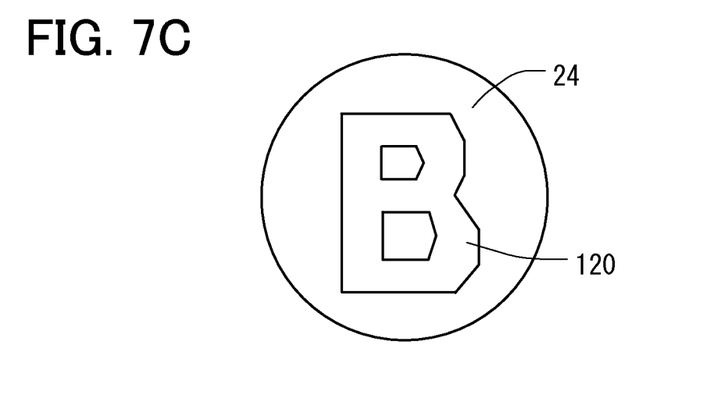

FIGS. 7A to 7C show an example in which a letter A is indicated as the projected graphic symbol 120, and the letter A is switched to a letter B. As described above, as the knob body 20 is rotated, the graphic plate 50 is also rotated accordingly. In the state of FIG. 7A, the screen 24 shows the letter A at the center position in the screen 24. In the present state, the knob body 20 is rotated clockwise thereby to rotate the projected graphic symbol 120 counterclockwise. Consequently, as in FIG. 7B, the letter A projected on the screen 24 is moved leftward in the drawing outward from the screen 24. Simultaneously, the letter B instead comes into the screen 24 leftward from the right side in the drawing. Thus, as shown in FIG. 7C, the letter A is totally out of the screen 24, and the letter B is instead indicated on the screen 24 at the center position. In this way, the graphic plate 50 is movable to switch the graphic symbols 56 one another in the order of the graphic symbols 56 arranged on the graphic plate 50. Thus, the projected graphic symbol 120 on the screen 24 is rotatable in conjunction with rotation of the knob body 20. The present configuration may enable a user to recognize the transition from the letter A to the letter B rotationally in accordance with manipulation of the knob body 20.

Optionally, the controller 100 may be configured to determine whether the projected graphic symbol 120 on the screen 24 is out of the center position. As described above, the controller 100 is configured to acquire the position of the projected graphic symbol 120 on the screen 24 based on the detected rotary position sent from the rotary sensor 76. That is, the controller 100 is configured to determine, according to the detected rotary position, whether the projected graphic symbol 120 on the screen 24 is out of the center position by a predetermined degree. In addition, when the controller 100 determines the position of the graphic symbol 56 be out of the center position, the controller 100 may manipulate the projection of the graphic symbol 56 on the screen 24 to modify the form of the projection.

Figure 8:
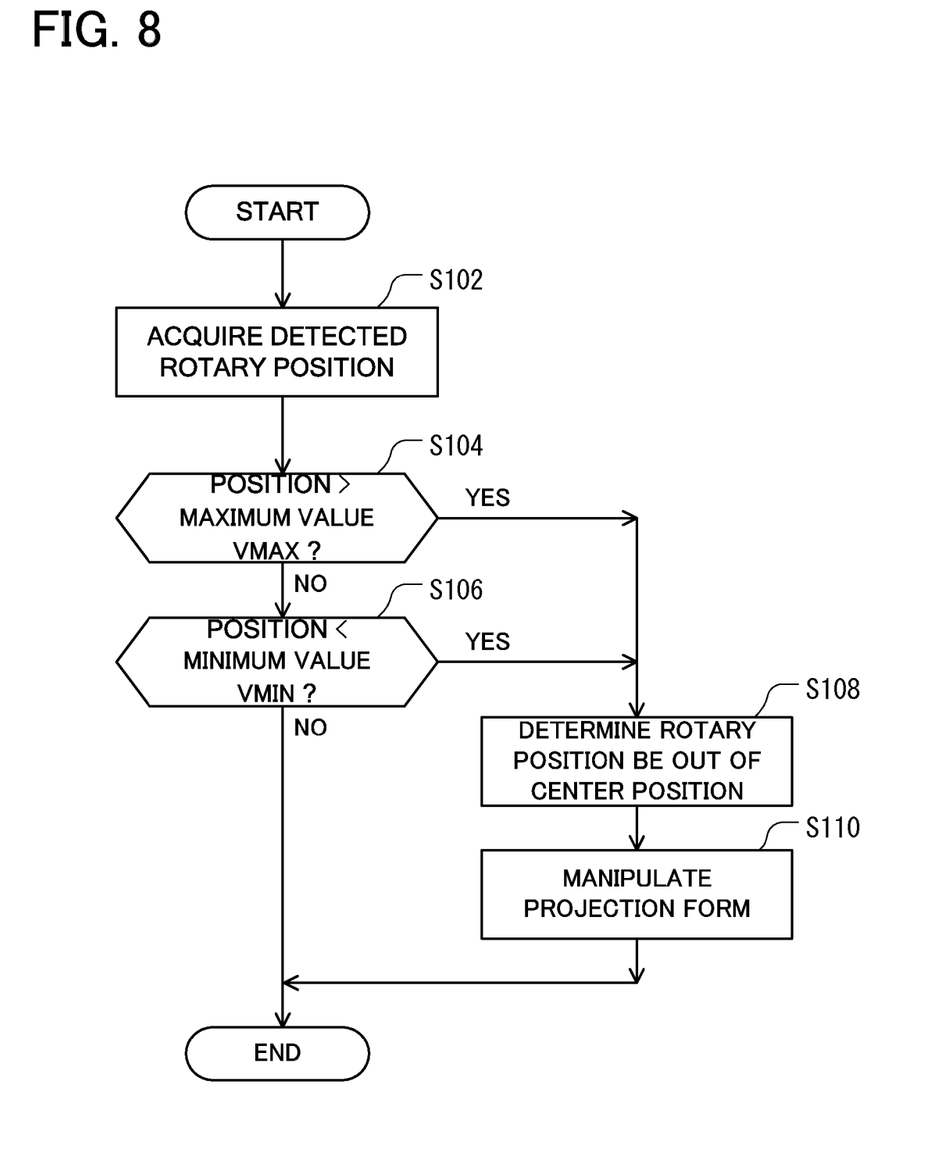
FIG. 8 is a flowchart showing a processing related to manipulation of a projection form of the knob device.

For example, the controller 100 may implement a processing shown in FIG. 8 at a predetermined interval and/or on activation of the controller 100. At S102, the controller 100 acquires the detected rotary position from the rotary sensor 76. At S104, the controller 100 determines whether the detected rotary position is greater than a maximum value VMAX. On negative determination at S104 (NO), the controller 100 determine whether the detected rotary position is less than a minimum value VMIN. On negative determination at S104 (NO), the processing ends. On positive determination at S104 or at S106 (YES), the controller 100 determines that the detected rotary position is out of the center position. That is, the controller 100 determines that the projected graphic symbol 120 on the screen 24 is out of the center position by the predetermined degree defined by the maximum value VMAX or the minimum value VMIN. Subsequently, at S110, the controller 100 manipulates a projection form of the projected graphic symbol 120.

The maximum and minimum values VMAX and VMIN may be arbitrarily determined. The maximum and minimum values VMAX and VMIN may be a rotational movement, which is around a rotational center of the projected graphic symbol 120, by +5 degree and the rotational movement by −5 degree, respectively, relative to a center line of the screen 24. The maximum and minimum values VMAX and VMIN may be a linear movement in a lateral direction by +5% of the width of the screen and a movement in the lateral direction by −5% of the width of the screen, respectively, relative to the center line of the screen 24.

At S110, the controller 100 may employ various ways to manipulate the projection form of the projected graphic symbol 120.

For example, at S110, the controller 100 may de-activate the light source 70 or may attenuate activation of the light source 70. In this way, the controller 100 may manipulate the projection form to hide or dim the projected graphic symbol 120 on the screen 24.

For example, at S110, the controller 100 may activate an additional light source to illuminate the screen 24 entirely to disable recognition of the projected graphic symbol 120 on the screen 24. The additional light source may be equipped separately from the light source 70. The additional light source may be equipped in the hollow space 20A of the knob body 20 and may be located close to the screen 24 to emit light entirely on the screen 24. The additional light source may be configured to emit intense light to illuminate the screen 24 entirely further than the projection of the graphic symbol 56 caused by the light source 70.

Alternatively or in addition, the screen 24 may have a color filter property to scatter light selectively. Specifically, the screen 24 may be configured selectively to pass through light in a specific color and selectively to disable passage of light in an invisible color other than the specific color. In addition, the light source 70 may be configured to emit light selectively in the specific color and in the invisible color. In the present configuration, at S110, the controller 100 may cause the light source 70 to change the color of the light source 70 from the specific color into the invisible color thereby to disable recognition of the projected graphic symbol 120 on the screen 24.

(Modification)

Figure 9:
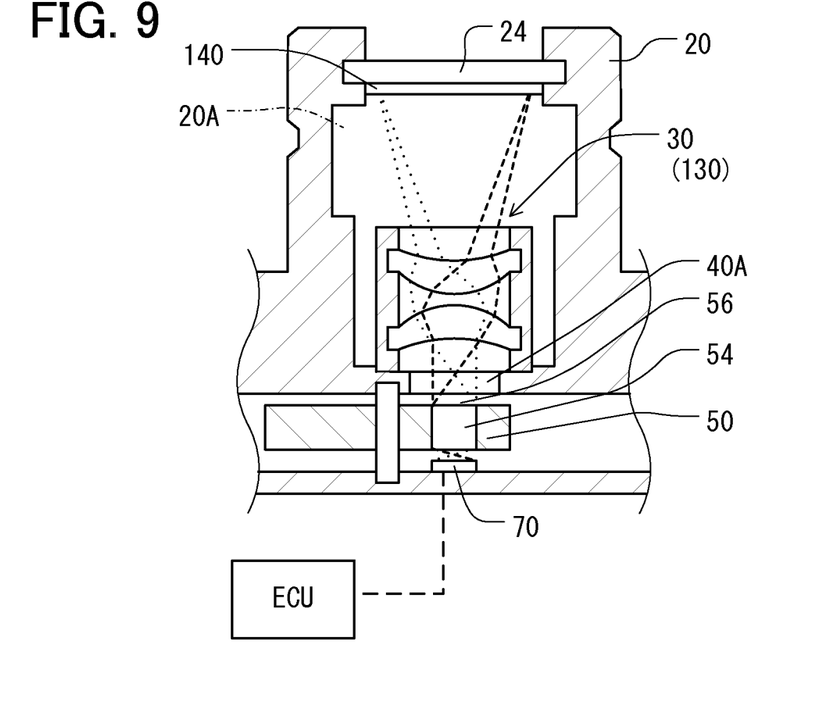
FIG. 9 is a schematic side view showing a knob device according to modifications of the first embodiment.

As shown in FIG. 8, for example, the optical device 30 may be equipped with an actuator 130 to move at least one of the lenses 34 and 36. The actuator 130 may be electrically connected with the controller 100 and may be controllable with the controller 100. In this way, the controller 100 may be enabled to manipulate the distance between the lenses 34 and 36 to modify a mechanical focus between the lenses 34 and 36. In this configuration, at S110 in FIG. 8, on determination that the detected rotary position is out of the center position, the controller 100 may manipulate the actuator 130 to modify the mechanical focus thereby to lose focus of the projected graphic symbol 120 on the screen 24. In this way, the optical device 30 may render the projected graphic symbol 120 blur thereby to disable recognition of the projected graphic symbol 120 on the screen 24.

For example, a supplemental sheet 140 may be equipped in the hollow space 20A behind the screen 24. The supplemental sheet 140 may be configured to modify an optical property such as a transparency and/or color according to application of an electric driving signal such as a voltage signal. In this configuration, at S110 in FIG. 8, on determination that the detected rotary position is out of the center position, the controller 100 may manipulate (i.e., activate or deactivate) application of the electric driving signal to the supplemental sheet 140 thereby to manipulate the optical property of the supplemental sheet 140. In this way, the supplemental sheet 140 may be caused to dim, hide, and/or blur the graphic symbol 56 thereby to disable recognition of the projected graphic symbol 120 on the screen 24.

(Second Embodiment)

Figure 10:
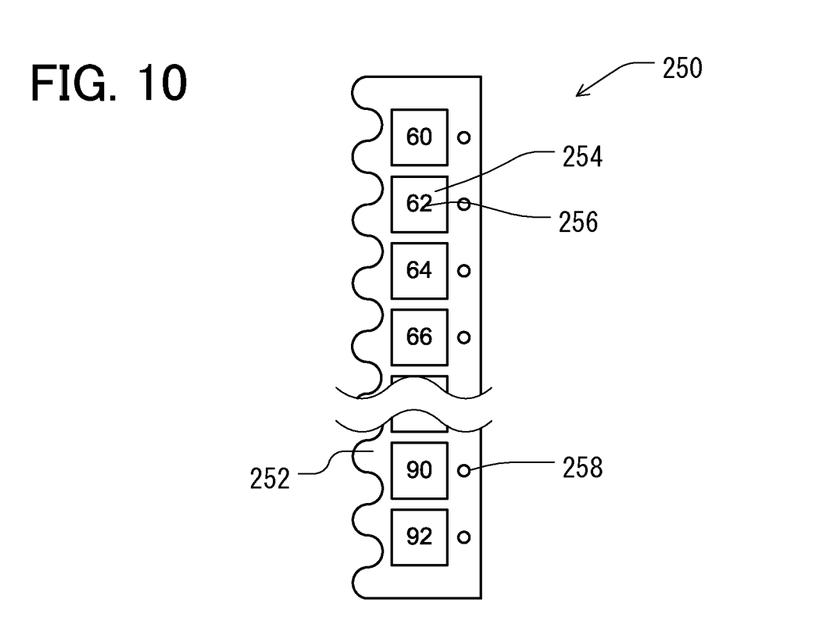
FIG. 10 is a top view showing a graphic plate according to a second embodiment.
Figure 11:
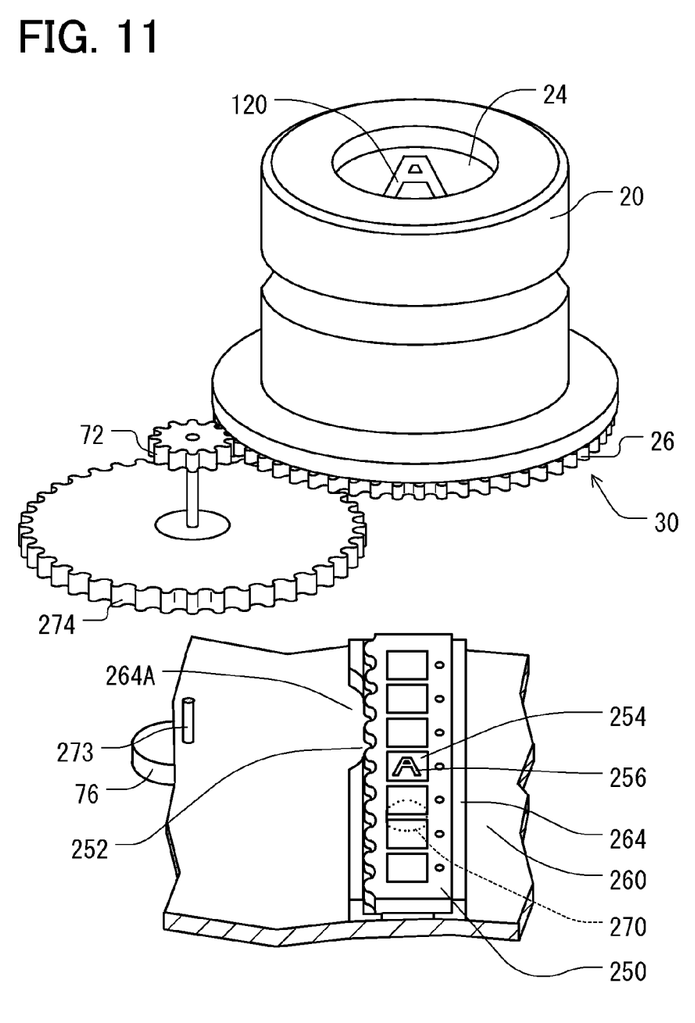
FIG. 11 is a schematic perspective view showing components of the knob device according to the second embodiment.

According to a second embodiment, as shown in FIGS. 10 and 11, a graphic plate 250 is in a strip shape elongated in a longitudinal direction. The graphic plate 250 has an outer periphery (lateral periphery) having a gear portion 252. The gear portion 252 extends in the longitudinal direction of the graphic plate 250. Similarly to the first embodiment, the graphic plate 250 has multiple graphic windows 254, and the graphic windows 254 include graphic symbols 256, respectively. The graphic symbols 256 are arranged on the graphic plate 250 in the longitudinal direction. The graphic plate 250 has multiple dents 258 arranged in the longitudinal direction.

In FIG. 11, the graphic plate 250 is fitted to a rail 264 equipped on a PCB 260. The graphic plate 250 is slidable along the rail 264 in the elongated direction. The rail 264 has a notch 264A through which the gear portion 252 of the graphic plate 250 is exposed. A plate gear 274 is meshed to the gear portion 252. Thus, the plate gear 274 and the gear portion 252 form a lack and pinion structure. A light source 270 is equipped on the PCB 260 and is located behind the graphic plate 250.

Similarly to the first embodiment, the knob gear 72, the plate gear 274, and the rotary sensor 76 are rotatable around a common shaft 273 relative to the base 40 (FIG. 1) and the PCB 260. The knob gear 72 is meshed with the gear member 26 of the knob body 20. The plate gear 274 is meshed with the gear portion 252 of the graphic plate 250. In this way, the graphic plate 250 is mechanically coupled ultimately with the knob body 20. Thus, the graphic plate 250 is slidable in conjunction with rotation of the knob body 20 via the gear member 26, the knob gear 72, and the plate gear 274. That is, the graphic symbols 256 are movable linearly by rotating the knob body 20 by a user.

In the second embodiment, when the knob body 20 is rotated clockwise, the projected graphic symbol 120 (letter A) is moved linearly upward in the drawing outward from the screen 24. Simultaneously, a subsequent letter, such as the letter B, instead comes into the screen 24 upward in the drawing from the lower side in the drawing. Thus, the letter A is totally out of the screen 24, and the subsequent letter B is instead indicated on the screen 24 at the center position. In this way, the graphic plate 50 is movable to switch the graphic symbols 56 one another in the order of the graphic symbols 56 arranged on the graphic plate 50. The present configuration may enable a user to recognize the transition from the letter A to the subsequent letter linearly in accordance with manipulation of the knob body 20.

The manipulation of the projection form described in the first embodiment may be applicable to the present second embodiment. In this case, the maximum and minimum values VMAX and VMIN may be arbitrarily determined. The maximum and minimum values VMAX and VMIN may be a linear movement in the longitudinal direction by +5% of the length of the screen and a movement in the longitudinal direction by −5% of the length of the screen, respectively, relative to the center line of the screen 24.

The rail 264 may be equipped to the base 40, and in this case, the graphic plate 250 may be slidably supported by the base 40.

(Other Embodiment)

The number, arrangement, and the contents of the graphic windows and the graphic symbols are examples and may employ various modifications.

The knob device may be a pushbutton configured to move the graphic plate to switch the at least one of the graphic symbols to another of the graphic symbols when being pushed. Specifically, the knob device may be configured to rotate or to move axially the graphic plate by one graphic symbol in response to one push. The push button may be coupled with the graphic plate via, for example, bevel gears to enable to convert a linear movement of the push button into the rotary movement or the axial movement of the graphic plate in a perpendicular direction. The push button may be further coupled with the graphic plate via, for example, a one-way clutch not to return the switched graphic symbol to the previous graphic symbol thereby to maintain the switched graphic symbol.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A knob device comprising:
   a knob body having a hollow space and having an end equipped with a screen;
   a graphic plate having a plurality of graphic windows including graphic symbols, respectively; and
   a light source configured to emit light through both at least one of the graphic windows and the hollow space to project at least one of the graphic symbols on the screen, wherein
   the graphic plate is movable to switch the at least one of the graphic symbols to an other of the graphic symbols, wherein
   the knob device further comprises:
   a knob gear meshed with a gear member of the knob body; and
   a plate gear coaxial with the knob gear and meshed with a gear portion of the graphic plate.

2. The knob device according to claim 1, wherein each of the graphic symbols is a stationary mark immovable in corresponding one of the graphic windows.

3. The knob device according to claim 1, wherein at least one of the graphic windows is formed of a translucent material, and at least one of the graphic symbols is:
   printed on the at least one of the graphic windows;
   molded on the at least one of the graphic windows; or
   a separate member equipped on the graphic windows.

4. The knob device according to claim 1, wherein the screen, at least one of the graphic windows, and the light source are arranged coaxially along an axis.

5. The knob device according to claim 1, wherein
the knob body is mounted to a base and is rotatable relative to the base.

6. The knob device according to claim 1, wherein
the graphic plate is in a disc shape,
the graphic symbols are arranged circumferentially on the graphic plate, and
the graphic plate is rotatable in conjunction with rotation of the knob body via the gear member, the knob gear, and the plate gear, and the gear portion.

7. The knob device according to claim 6, wherein
at least one of the graphic symbols is projected as a projected graphic symbol on the screen, and
the projected graphic symbol is rotatable on the screen in conjunction with rotation of the knob body.

8. The knob device according to claim 1, wherein
the graphic plate is in a strip shape,
the graphic symbols are arranged longitudinally on the graphic plate, and
the graphic plate is linearly movable in conjunction with rotation of the knob body via the gear member, the knob gear, the plate gear, and the gear portion.

9. The knob device according to claim 8, wherein
at least one of the graphic symbols is projected as a projected graphic symbol on the screen, and
the projected graphic symbol is linearly movable on the screen in conjunction with rotation of the knob body.

10. The knob device according to claim 1, wherein
a pin; and
a biasing member biasing the pin onto the graphic plate, wherein
the graphic plate has a plurality of dents to receive a tip end of the pin.

11. The knob device according to claim 1, further comprising:
an optical device including at least one lens to magnify at least one of the graphic symbols to be projected on the screen.

12. The knob device according to claim 11, wherein
the at least one lens includes convex lenses opposed to each other at convex sides.

13. The knob device according to claim 1, further comprising:
a rotary sensor configured to detect a rotary position of the knob body and to send a rotary signal, which represents the rotary position, to a controller, wherein
the light source is configured to modify projection of at least one of the graphic symbols on the screen, in response to a driving signal from the controller on detection of change in the rotary position.

14. The knob device according to claim 13, wherein
the light source is configured, on determination by the controller that the projected graphic symbol is out of a center position in the screen, to be deactivated or to change a color of light.

15. The knob device according to claim 14, wherein
the screen is configured to scatter light selectively.

* * * * *